(12) United States Patent
Haugen et al.

(10) Patent No.: US 9,904,703 B1
(45) Date of Patent: Feb. 27, 2018

(54) DETERMINING CONTENT OF INTEREST BASED ON SOCIAL NETWORK INTERACTIONS AND INFORMATION

(75) Inventors: Frances B. Haugen, Mountain View, CA (US); Daniel M. Crichton, Eden Prairie, MN (US)

(73) Assignee: Google LLC, Mountain View, CA (US)

( * ) Notice: Subject to any disclaimer, the term of this patent is extended or adjusted under 35 U.S.C. 154(b) by 331 days.

(21) Appl. No.: 13/605,958

(22) Filed: Sep. 6, 2012

Related U.S. Application Data (60) Provisional application No. 61/531,287, filed on Sep. 6, 2011.

(51) Int. Cl.
*G06F 17/30* (2006.01)

(52) U.S. Cl.
CPC .............. *G06F 17/30424* (2013.01)

(58) Field of Classification Search
CPC ............ G06F 17/30867; G06F 17/30424
USPC ........................................ 707/723
See application file for complete search history.

(56) References Cited

U.S. PATENT DOCUMENTS

| 6,256,633 | B1* | 7/2001 | Dharap | G06F 17/30867 |
| 8,478,519 | B2* | 7/2013 | Agarwal | G01C 21/20 340/995.17 |
| 8,838,564 | B2* | 9/2014 | Sahni | H04L 67/22 707/706 |
| 2003/0212594 | A1* | 11/2003 | Hogan | 705/14 |
| 2006/0212415 | A1* | 9/2006 | Backer | G06F 17/30684 706/45 |
| 2008/0208956 | A1* | 8/2008 | Spiridellis et al. | 709/203 |
| 2009/0125511 | A1* | 5/2009 | Kumar | G06Q 10/107 |
| 2009/0292814 | A1* | 11/2009 | Ting | G06F 15/16 709/229 |
| 2009/0327282 | A1* | 12/2009 | Wittig | G06F 17/30864 |
| 2010/0057546 | A1* | 3/2010 | Wang | G06Q 30/0241 705/14.4 |
| 2010/0083124 | A1* | 4/2010 | Druzgalski | G06F 17/3087 715/738 |
| 2010/0169340 | A1* | 7/2010 | Kenedy et al. | 707/758 |
| 2010/0169343 | A1* | 7/2010 | Kenedy | G06F 17/30867 707/758 |
| 2010/0198812 | A1* | 8/2010 | Athsani | G06F 17/30867 707/722 |
| 2010/0241663 | A1* | 9/2010 | Huang | G06Q 30/02 707/770 |
| 2011/0131100 | A1* | 6/2011 | Soza | G06Q 30/02 705/14.73 |
| 2011/0252027 | A1* | 10/2011 | Chen | G06F 17/30525 707/728 |

(Continued)

OTHER PUBLICATIONS

Carmel et al., "Personalized Social Search Based on the User's Social Network", in Proceedings of the 18th ACM Conference on Information and Knowledge Management, pp. 1227-1236, 2009.*

*Primary Examiner* — Phuong Thao Cao
(74) *Attorney, Agent, or Firm* — Fish & Richardson P.C.

(57) ABSTRACT

Methods, systems, and apparatus, including computer programs encoded on computer storage media, for searching using social network data. Techniques include: receiving a request for search results; in response to the request, obtaining search results using one or more social engagement signals to identify content deemed to have entertainment value, where the one or more social engagement signals are unspecified in the request; and providing the search results to a computing device.

25 Claims, 5 Drawing Sheets

(56) References Cited

U.S. PATENT DOCUMENTS

| | | | |
|---|---|---|---|
| 2012/0066202 A1* | 3/2012 | Hatazawa | G06Q 50/01 707/710 |
| 2012/0109966 A1* | 5/2012 | Liang et al. | 707/740 |
| 2012/0166432 A1* | 6/2012 | Tseng | G06F 17/30867 707/728 |
| 2012/0166452 A1* | 6/2012 | Tseng | G06F 17/30867 707/749 |
| 2012/0166530 A1* | 6/2012 | Tseng | G06Q 30/0255 709/204 |
| 2012/0239466 A1* | 9/2012 | Hu | G06Q 30/0207 705/14.1 |
| 2012/0296920 A1* | 11/2012 | Sahni | H04L 67/22 707/749 |
| 2012/0310922 A1* | 12/2012 | Johnson | G06F 17/30867 707/722 |
| 2012/0310926 A1* | 12/2012 | Gannu | G06F 17/30702 707/723 |
| 2012/0310927 A1* | 12/2012 | Johnson | G06F 17/30864 707/723 |
| 2013/0018965 A1* | 1/2013 | Ramachandran | G06Q 10/107 709/206 |
| 2013/0238634 A1* | 9/2013 | Kast | G06N 5/04 707/748 |
| 2013/0262509 A1* | 10/2013 | Athsani | G06F 17/30867 707/769 |
| 2016/0210357 A1* | 7/2016 | Wohltman | G06F 17/30241 |

* cited by examiner

DETERMINING CONTENT OF INTEREST BASED ON SOCIAL NETWORK INTERACTIONS AND INFORMATION

This application claims the benefit under 35 U.S.C. § 119(e) of the filing date of U.S. Patent Application No. 61/531,287, for Social Search, which was filed on Sep. 6, 2011, and which is incorporated here by reference.

BACKGROUND

This disclosure relates generally to searching using social network data.

Search engines identify resources (e.g., images, audio, video, Web pages, text, documents) that are relevant to a user's needs and present information about the resources in a manner that is useful to the user. Typically, a search engine returns a set of search results in response to a user submitted query. Such a search is transactional in that it attempts to locate content to satisfy a need.

Social networks permit users to post information about themselves and to communicate with other people, e.g., their friends, family, and co-workers. Some social networks permit users to specify friendships with other users. Additionally, social network users may write descriptions of their interests and disinterests (e.g., what they like or don't like), compose stories, describe their lives, etc.

SUMMARY

An example of a technique for performing a social search may include the following operations: receiving a request for search results; in response to the request, obtaining search results using one or more social engagement signals to identify content items, where the one or more social engagement signals are unspecified in the request; and providing the search results identifying content items to a computing device.

In the foregoing technique: the one or more social engagement signals for a content item may correspond to a number of times the content item has been shared in a social networking service; the one or more social engagement signals may correspond to a number of comments on the content item in a social networking service; the one or more social engagement signals may correspond to a length of the content item in a social networking service; the one or more social engagement signals may correspond to a composition of the content item in a social networking service; the one or more social engagement signals may correspond to a number of links in the content item in a social networking service; the one or more social engagement signals may correspond to a manner in which links were incorporated into the content item in a social networking service; the one or more social engagement signals may correspond to a pattern in which the content item of a social networking service has been shared; the one or more social engagement signals may correspond to a number of recommendations of the content item in a social networking service; or the one or more social engagement signals may correspond to a combination of the foregoing examples.

In the foregoing technique, key words may be absent from the request for search results. The search results may include content items that had been added to a corpus of content items of a social networking service by members of the social networking service.

Examples of operations that may be performed in the foregoing technique may include ranking the search results before providing the search results to the computing device. The search results may be ranked in accordance with weights associated with different ones of the social engagement signals. The search results may be ranked in accordance with information contained in a profile of a member of a social networking service.

Another example of a technique for performing a social search may include the following operations: searching for content through a social networking service using one or more social engagement signals, where the searching is performed by traversing an indexed cache of content to identify content items that correspond to social engagement signals, and where the social engagement signals are obtained from a storage medium of the social networking service; ranking content items obtained as a result of the searching, where the content items are ranked according to criteria, an example of which includes information available from a profile of a member of the social networking service; and outputting the ranked content to a computing device.

In the foregoing technique, the social engagement signals for a content item may correspond to one of, or two or more of, the following: a number of comments on the content item in the social networking service, a length of the content item in the social networking service, a composition of the content in the social networking service, a number of links in the content item in the social networking service, a manner in which links were incorporated into the content item in the social networking service, a pattern in which the content item in the social networking service has been shared, and a number of recommendations of the content item in the social networking service.

Advantages of the foregoing techniques may include providing, in response to a request, search results that are likely to be of interest to users. The search results may be obtained, and provided, absent key words in an input request for search results. Accordingly, a searcher may have access to search results that are of interest and for which they might not have otherwise searched.

All or part of the systems and techniques described herein may be implemented as a computer program product that includes instructions that are stored on one or more non-transitory machine-readable storage media, and that are executable on one or more data processing devices, e.g., computers. All or part of the systems and techniques described herein may be implemented as an apparatus, method, or electronic system that may include one or more processing devices and memory to store executable instructions to implement the stated functions.

The details of one or more implementations are set forth in the accompanying drawings and the description below. Other features, aspects, and advantages will be apparent from the description and drawings, and from the claims.

BRIEF DESCRIPTION OF THE DRAWINGS

Like reference symbols in the various drawings indicate like elements.

DETAILED DESCRIPTION

Described herein are systems and methods for searching on a social network using social engagement signals. For example, an index associated with a social networking service may be searched using one or more signals that are selected to identify content items that may be of interest to users. The signals may be predefined and independent of (e.g., unrelated to) an instruction to perform a search. For example, in some implementations, these signals are not based on key words input to a search engine (e.g., the signals are unspecified in a request for search results). As a result, content that may be of interest to the user, e.g., "interesting content", can be provided to a user, without the user actually having to provide a query (e.g., search terms for a text query, an image as an image query) for that content. The content may be from a corpus of the social networking service or from public sources, e.g., the Internet. Appropriate content that is available to a search engine (e.g., public and or authorized, private content) may be provided.

In an example implementation, a user may initiate a search for interesting content by providing a computer instruction through a user interface (e.g., by selecting an appropriate search option presented on a Web page). As noted above, the search can be initiated by the user without providing a search query. In response to the instruction, the user is presented with a number of search results by a search system.

In an example, a user initiates the search by clicking a Web button on a Web page maintained by a social networking service. In response, a search system associated with the social networking service identifies content by searching an index of social media content (which the user is authorized to access) and public content (e.g., Web sites) that have been interacted with (e.g., shared, commented-on, endorsed, etc.) by members of the social networking service. The search system searches the index by using social engagement signals associated with each resource (content item) represented in the index, where the social engagement signals may represent the number of times each of the respective resources has been interacted with by members of the social network, the types of interactions, the number of members who interacted, and the like. The resources which have been interacted with substantially according to the social engagement signals may be presented as a ranked listing of search results.

The process described above may be implemented in an appropriate network environment, with appropriate devices and computing equipment. An example of such an environment is described below.

Figure 1:
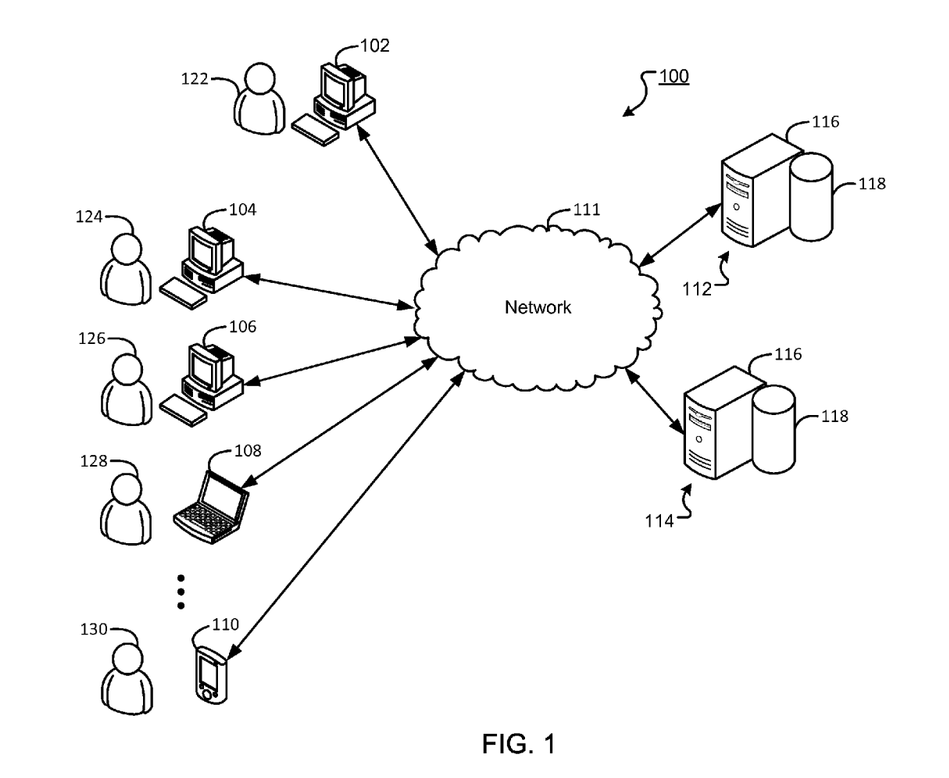
FIG. 1 is a block diagram showing an example network environment on which the process described herein for searching a social network using social engagement signals may be implemented

FIG. 1 is a block diagram showing an example network environment on which the process described herein for searching a social network using social engagement signals may be implemented. In this regard, FIG. 1 shows an example network environment 100. The network environment 100 includes computing devices 102, 104, 106, 108, 110 that can each communicate with a first server system 112 and/or a second server system 114 over a network 111. Each of computing devices 102, 104, 106, 108, 110 has a respective user 122, 124, 126, 128, 130 associated therewith. Each of the first and second server systems 112, 114 includes a computing device 116 and a machine-readable repository, or database 118. Example environment 100 may include many thousands of Web sites, computing devices and servers, which are not shown.

The network 111 can include a large computer network, e.g., a local area network (LAN), wide area network (WAN), the Internet, a cellular network, or a combination thereof connecting a number of mobile computing devices, fixed computing devices, and server systems. The network(s) may provide for communications under various modes or protocols, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a Bluetooth, WiFi, or other such transceiver.

Computing devices 102 to 110 enable respective users 122 to 130 to access and to view documents, e.g., Web pages included in Web sites. For example, user 122 of computing device 102 can view a Web page using a Web browser. The Web page can be provided to computing device(s) 102 to 110 by server system 112, server system 114 or another server system (not shown). In example environment 100, computing devices 102, 104, 106 are illustrated as desktop-type computing devices, computing device 108 is illustrated as a laptop-type computing device 108, and computing device 110 is illustrated as a mobile computing device. It is appreciated, however, that computing devices 102 to 110 can each include a type of computing device, examples of which include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of two or more of these data processing devices or other appropriate data processing devices. In some implementations, a computing device can be included as part of a motor vehicle (e.g., an automobile, an emergency vehicle (e.g., fire truck, ambulance), a bus).

Figure 2:
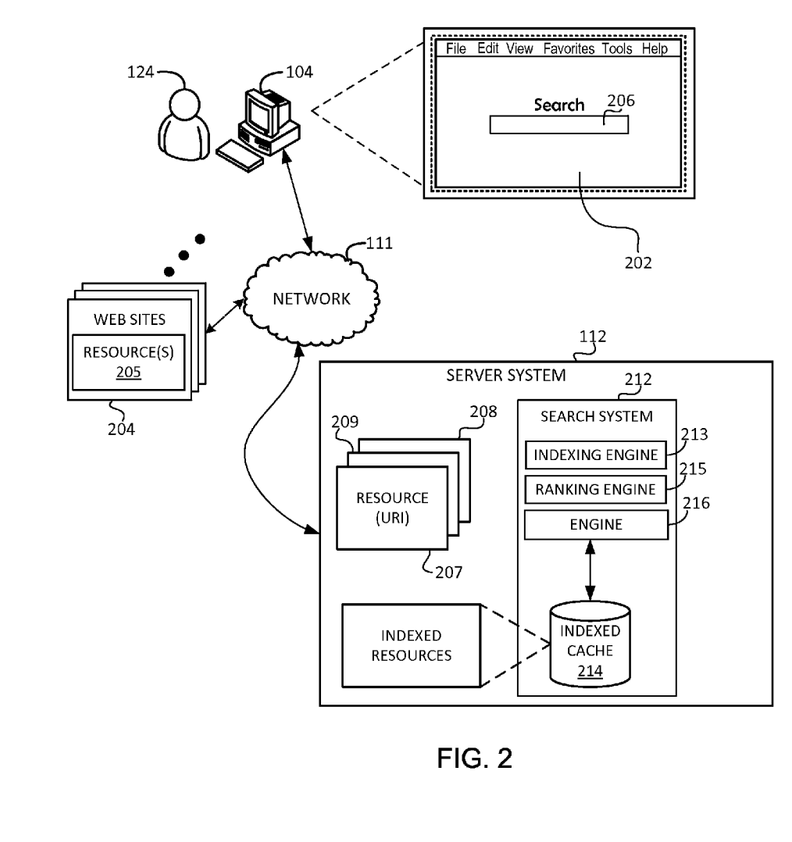
FIG. 2 is a diagram of an example portion of the network environment of FIG. 1.

FIG. 2 is a diagram of an example portion of the network environment of FIG. 1. In this regard, FIG. 2 shows a portion 200 of example network environment 100. Network environment 100 includes a search system 212 that identifies resources 205 (e.g., Web pages, images, or news articles on the Internet) by crawling and indexing resources provided by content publishers on Web sites 204.

In FIG. 2, computing device 104 communicates with server system 112 to display a Web page 202 for accessing a social networking service. In this example, server system 112 stores a plurality of resources 204, 206, 208, each having an associated resource identifier (Resource ID). In this example, resources 204, 206, 208 correspond to different content available from the social networking service and from other public and private sources, e.g., public Web sites, social networking Web sites, picture hosting Web sites, and online e-mail providers. Owners of private content may not give permission to have their private content made available to others.

To view a Web page, user 124 can input or select a Resource ID using a browser that is executed on computing device 104. The Resource ID can include, for example, a uniform resource indicator (URI) and a uniform resource locator (URL). A request including the Resource ID is transmitted from computing device 104 to server system 112 over network 111. In response, the server system identifies the requested resource based on the Resource ID, and transmits the resource to computing device 104 over network 111. For example, the resource may be a Web page 202, through which a user may access a social networking service. The Web page may include a field 205 for inputting user account information, e.g., a username and password.

The social networking service may include a search system 212 that identifies resources by crawling and indexing those resources. In this regard, search system may include an indexing engine 213 that indexes resources (e.g., discussion topic by subject, discussion topics by tag, user profiles, social media posts, and the like), which may be found, e.g., in the corpus of the social networking service, e.g., a collection or repository of content, or on publicly-accessible Web sites. In some implementations, an owner of private content may opt-out of having their private content included in the search index. An index cache 214 stores the index information, and a ranking engine 215 (or other software) ranks the resources based on criteria, e.g., popularity. The search may be implemented, e.g., on server system 112 as shown, which may include multiple computers at multiple locations, or on other appropriate hardware. The indexed and, optionally, cached copies of the resources can be stored in an indexed cache 214. In response to an input, the search system can access indexed cache 214 to identify resources that are relevant to the input. Ranking engine 215 ranks the identified resources based, e.g., on popularity or other appropriate criteria.

Figure 3:
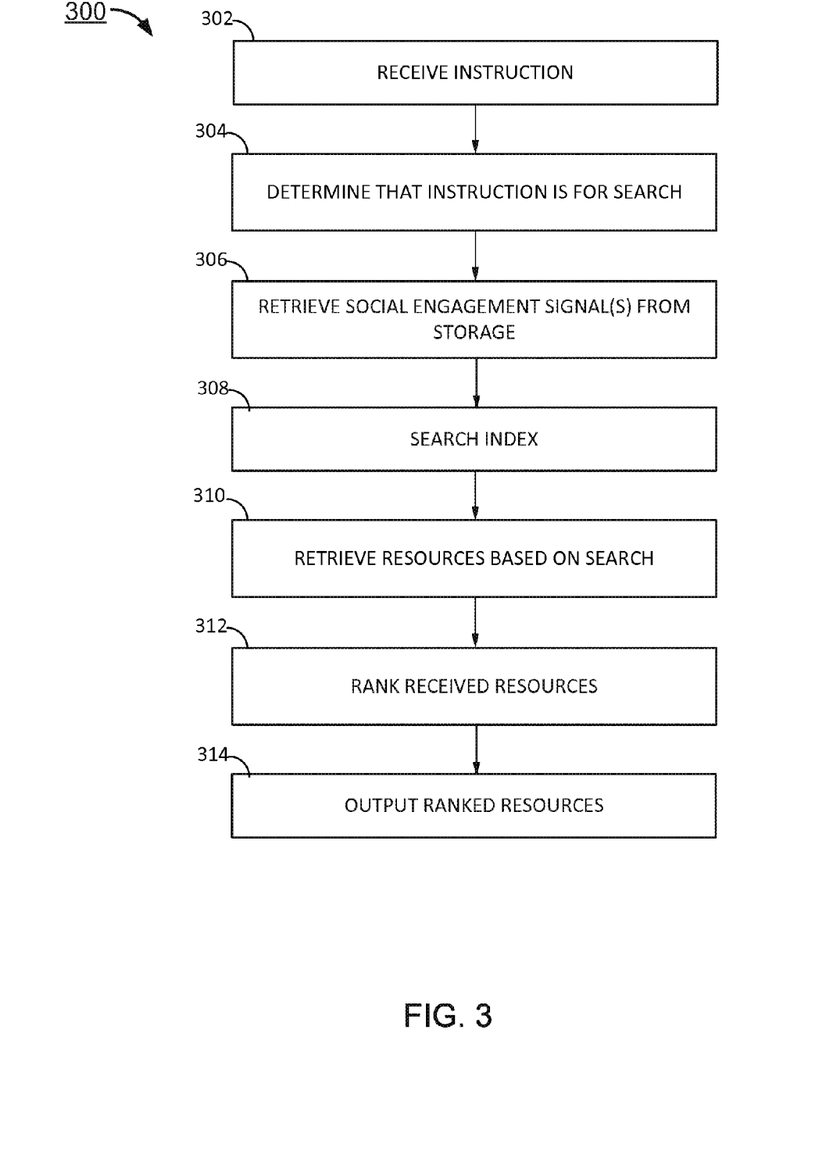
FIG. 3 is a flowchart of an example method for identifying and retrieving search results determined by a search system to likely be interesting for users.

FIG. 3 is a flowchart of an example method for identifying and retrieving search results determined by a search system to likely be interesting for users. In this regard, FIG. 3 shows an example process 300 for retrieving search results using social engagement signals. Process 300 may be performed, e.g., by engine 216 in server system 112. However, other appropriate hardware and/or software may be used to perform process 300.

Process 300 receives an instruction (302). The instruction may be received from a Web page of a user's computing device. For example, the user may select a button or other control or a link provided on the Web page. An example of such a button is button 402, which is on the Web page shown in FIG. 4. As described below, in response to receipt (302) of the instruction, process 300 performs a search of indexed resources using one or more social engagement signals. The user need not provide search terms in this case; rather, searching is performed independently of a user input (other than the instruction to perform the search itself). Examples of social engagement signals were provided above and are provided below.

Process 300 determines (304) that the received instruction is instructing to perform a search using social engagement signals. Process 300 may make this determination based on the content of the instruction. For example, such information may be included in the search instruction that indicates to search for content using the stored social engagement signals.

Following operation 304, process 300 retrieves one or more social engagement signals (306). To retrieve the social engagement signal(s), process 300 may access a data structure (e.g., a database or index) in which social engagement signals are stored. In some implementations, the data structure may be the search index. For example, a social engagement signal associated with a resource may be stored in the search index along with an identifier (ID) for that resource.

A social engagement signal is storable data that indicates how much interest users, e.g., members of a social networking service, have shown in a resource (for example, the probability that a user will engage with the resource). In some implementations, a social engagement signal can be a quantifiable value associated with a particular resource (e.g., a particular social media post or other similar social media content item) that is indicative of the interest of a community of users in the content item. In some implementations, a social engagement signal can correspond to the number of times a particular resource has been searched, shared, commented on, or recommended in a social networking service by members of the social networking service. For example, a resource that has been retrieved a number of times, in response to independent search queries in a social networking service by members of the social networking service, may be deemed to be of interest to members of the social networking service. For example, a resource that has been retrieved more than 10, 100, 1000, etc. times within a specified time period, e.g., one day, a week, a month, etc. by members of the social networking service may be considered to be of interest to members of the social networking service.

In some implementations, an identified pattern of searching, sharing, commenting, and/or recommending can be a social engagement signal. In this regard, if the number of comments associated with a particular resource by members of the social networking service has recently spiked (or is known to spike at certain times) (e.g., 10, 100 or 1000 times within, e.g., a day, a week, a month, etc.), process 300 may determine that the resource is likely to currently be of interest (or will likely be of interest in the future). For example, a resource containing content associated with a sporting event (e.g., blogs) may be commented on, shared, or recommended with greater frequency during, directly before, or directly after the event. As such, this resource may be deemed by the search system to be of interest to some users at these times.

Social engagement signals can be determined (and subsequently stored in a data structure) continuously or at predetermined intervals. Further, although a number of social engagement signals have been described, other suitable social engagement signals can also be used. Additionally, in some implementations, a combination of two or more social engagement signals can be used for identifying resources that are likely to be of interest to a user.

Referring back to FIG. 3, process 300 may search an appropriate data structure for instances of certain types of social engagement signals (or, e.g., for a specified combination of social engagement signals), associated with all types of resources or associated with specified types of resources, that provide the strongest indication of user engagement (e.g., the strongest social engagement signals, e.g., the largest numbers of comments on resources). For instance, the search engine can identify a predetermined number of the strongest social engagement signals (e.g., the ten strongest social engagement signals, e.g., the ten largest numbers of comments).

The strength of a social engagement signal that is associated with a particular resource can be used as an estimate of the resource's interest to users. The strength of a social engagement signal may be determined based on the value of the signal (e.g., the number of times a particular resource has been shared, commented on, or recommended) or it may the value of the signal itself.

Process 300 searches (308) a search index, e.g., indexed cache 214, to identify resources associated with the strongest social engagement signals. Process 300 may identify such resources by matching the retrieved social engagement signals to the respective resources to which they are associated (310).

Engine 216 may rank the identified resources (312). For example, engine 216 can score the resources based on the strength of one or more associated social engagement signals, which may be weighted with signal-specific weights. Engine 216 may rank a resource based on the scores. Engine 216 may rank a resource associated with a relatively strong social engagement signal higher than a resource associated with a relatively weak social engagement signal. In some implementations, engine 216 can rank the resources based on relevance of the resources to perceived interests of the user. For example, engine 216 can rank the resources in accordance with information contained in the user's profile (e.g., their perceived interests). For another example, engine 216 can optionally rank the resources in accordance with content of the resources. For example, a first Web page that includes several links may be determined to be of greater value than a second Web page that includes a single link, because the first Web page may provide more "link surfing" opportunities (link surfing may be considered the process of starting on one Web page and clicking on various hyperlinks to eventually finish on a different Web page that may, or may not, be predetermined). Further, a Web page that includes a number of relevant links incorporated in the text of an article or post may be determined to be of greater value than a Web page that lists a number of unrelated links in advertising space. For another example, a Web page including several videos may be determined by the search system to be of greater value than a Web page including a single video. Additionally, a Web page that includes several different types of content (e.g., text, still images, and vides) may be determined to be of greater value than a Web page that includes a single type of content (e.g., just text). In other implementations, the resources may not be ranked.

Process 300 generates search results corresponding to the resources, and outputs (314) the search results, e.g., according to the resource ranking, if any. For example, process 300 can output a Web page (e.g., a search results page) listing the search results, which identify the resources.

Figure 4:
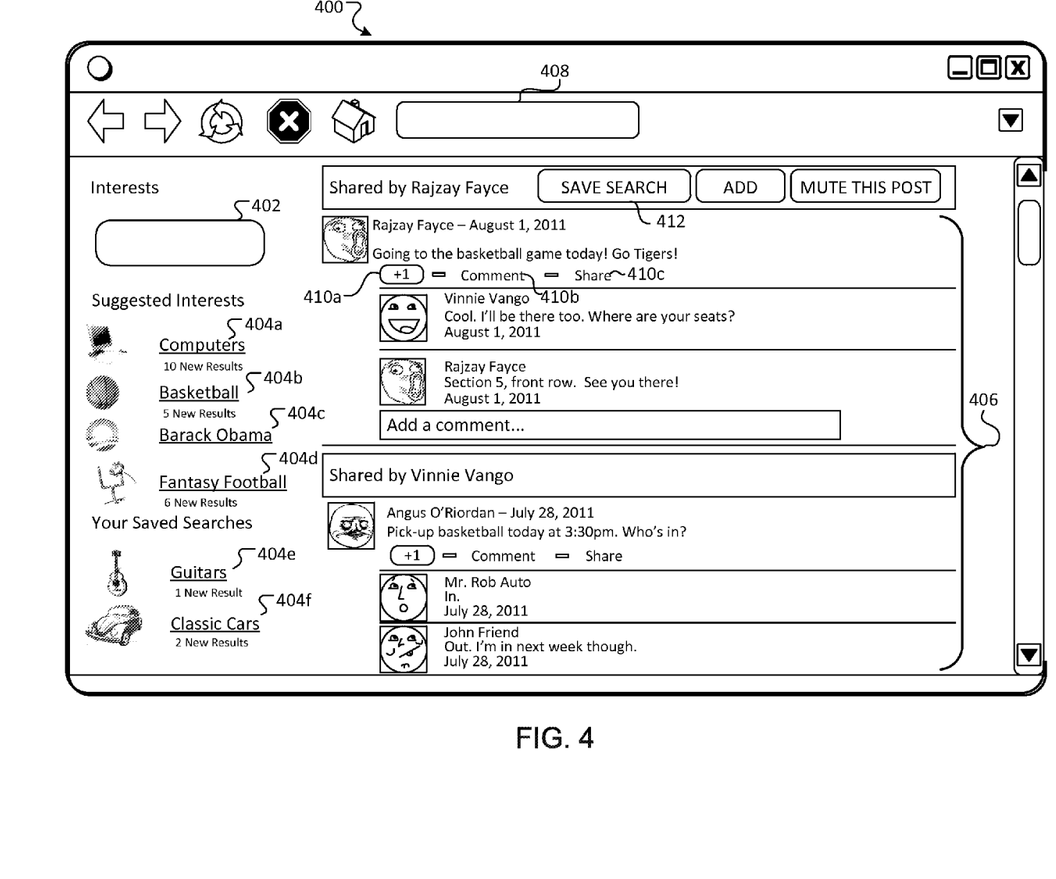
FIG. 4 depicts an example Web page that presents search options and search results to a user.

FIG. 4 depicts an example Web page that presents search options and search results to a user. In this regard, FIG. 4 shows an example Web page 400 for accessing a social networking service. Web page 400 can be displayed on a computing device through a suitable Web browser. Web page 400 may present a number of selectable search options to a user. For example, Web page 400 can include a button 402 that the user can select to initiate a social search of the type described herein. In response to a user selecting Web button 402, a search system provided by the social networking service can retrieve and present a number of search results that are likely to be of interest to the user (for example, by performing process 300). As described above, the search results can be generated based on a predefined type of social engagement signal (or a plurality of predefined signal types).

Web page 400 may present several other search options (which may include a number of user selectable links and/or Web buttons) that can effect retrieval of interesting and/or entertaining search results by the search system. For example, links 404a, 404b, 404c, and 404d can point to respective search results pages listing search results associated with various known or perceived interests of a user.

Each of links 404a, 404b, 404c, and 404d may point to a respective search results pages listing social media posts associated with a topic (i.e., "computers", "basketball", "Barack Obama", and "Fantasy Football") that has been determined to be of interest to the user. In some implementations, links 404a, 404b, 404c, and 404d can be provided by the search system automatically (for example, based on information included in the user's profile). Links may also be provided based on user interaction. For example, a user may specify topics of interest and prompt the search system to provide corresponding topical search links on, for example, the user's profile page. The search system may update the respective search results pages (for example, at predetermined intervals) and provide an indication when new search results have been identified or retrieved. New search results may correspond to search results that have been received since the search results pages were last updated.

As noted above, in some implementations, previous searches can be saved. Accordingly, a search system can present links 404e and 404f to a user for retrieving previously saved searches. In some examples, the search system can update the saved searches (for example, at predetermined intervals) and provide an indication when new search results have been identified or retrieved.

As shown, Web page 400 can also present a number of search results that can be output in response to a search performed by selecting the provided search options, or by entering a search terms into query box 408. In this example, search results 406 are presented in response to a user selecting Web button 402.

Search results 406 may be real-time search results that are both responsive to search criteria and relatively recent. For example, real-time search results can include search results representing resources that were last updated and/or uploaded within a predetermined amount of time (e.g., 60 seconds, 5 minutes, 30 minutes, 60 minutes, etc.). Real-time search results may be updated continuously or at predetermined intervals.

Example resources that may be represented by search results 406 include, but are not limited to, social media Web pages, blogs (e.g., blogs and/or blog posts), microblog Web pages, user profiles, discussion threads, and the like. Such resources can be resources crawled by a search engine (as noted above) or resources received from a provider feed. Example provider feeds include, for example, news feeds, Really Simple Syndication (RSS) feeds, or feeds from content hosting Web sites.

Web page 400 may present one or more social options to users. The social options can allow users to interact with other members of a social networking service. For example, social options 410a, 410b, and 410c can be selected by a user to recommend, comment, and/or share a resource represented by a search result. In this example, a user can recommend the resource represented by a search result by selecting social option 410a. By selecting social option 410a, the user can indicate to other users (through the social networking service) that the represented resource is interesting or entertaining. In some examples, this indication can be used for retrieving future search results for other users, as described below. By selecting social option 410b, the user can add a comment related to the resource. The comment can be incorporated in the content of the resource and/or stored separately by the social networking service. In some implementations, the social networking service can consider the comment as an indication that the resource is entertaining or of interest to the user. By selecting social option 410c, the user can share the resource with other users. Sharing may effect publication of the resource to one or more other associated users (e.g., members of the user's social graph). Sharing the resource can be considered by the social networking service as an indication that the resource is interesting or of interest to the user.

Web page 400 may present several miscellaneous options, in addition to search options 404 and social options 410. For example, the user can select option 412 to save an existing search. Saving a search may allow the user to return to the search results page without resubmitting the query. A search system may save an existing search by saving the list of retrieved search results. The search system can also save the existing search by saving the query associated with the list of search results.

Figure 5:
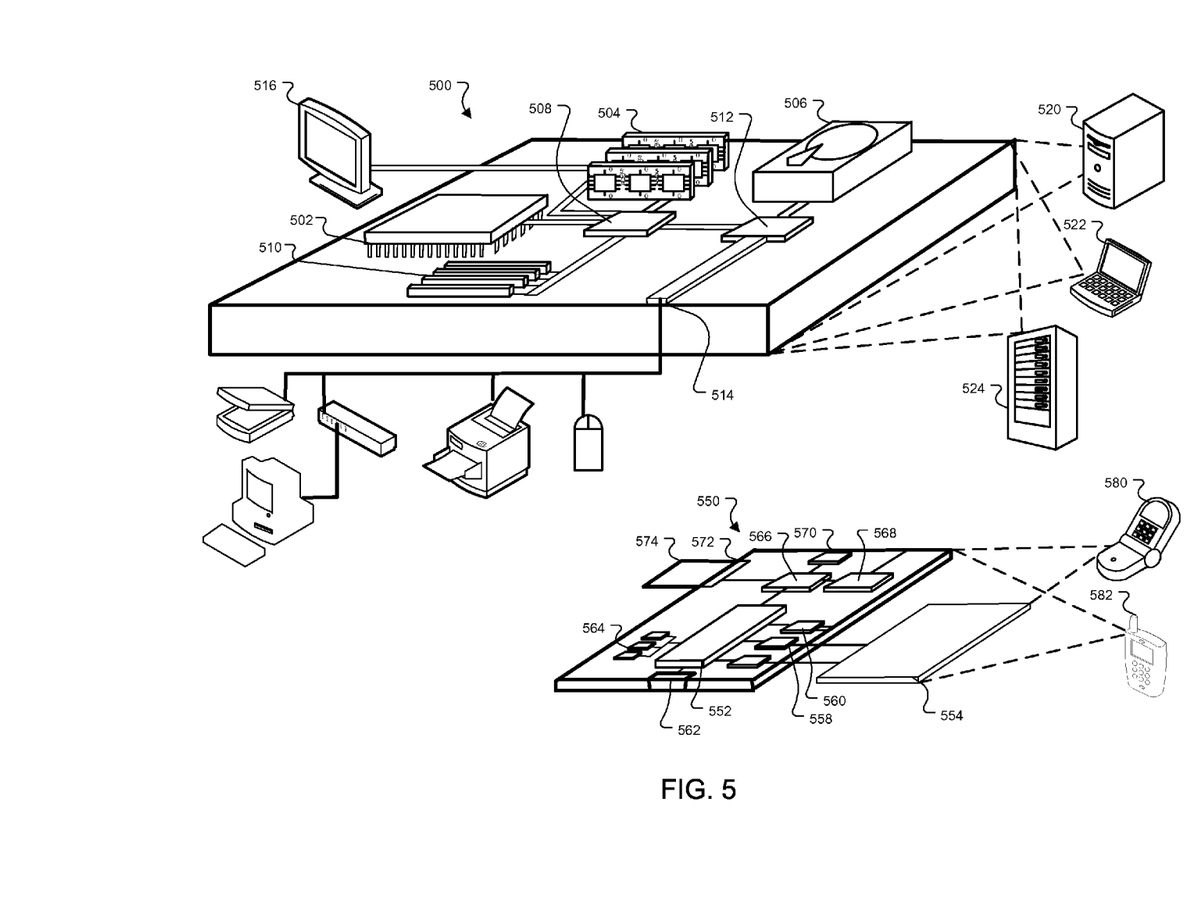
FIG. 5 shows examples of computing devices on which the processes described herein, or portions thereof, may be implemented.

FIG. 5 shows examples of computing devices on which the processes described herein, or portions thereof, may be implemented. In this regard, FIG. 5 shows an example of a generic computing device 500 and a generic mobile computing device 550, one or more of which may be used to implement all or part of the processes described herein. Mobile computing device 550 may be used as a client device of FIG. 1. Other client devices of FIG. 1 may also have the architecture of computing device 500.

Computing device 500 can be any form of digital computers, examples of which include laptops, desktops, workstations, personal digital assistants, servers, blade servers, mainframes, and other appropriate computers. Computing device 550 can be any form of mobile devices, examples of which include personal digital assistants, cellular telephones, smartphones, and other similar computing devices. The components shown here, their connections and relationships, and their functions, are meant to be exemplary only, and are not meant to limit implementations of the technology described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, for example, display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, examples of which include a magnetic or optical disk.

The storage device 506 is capable of providing mass storage for the computing device 500. In one implementation, the storage device 506 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 504, the storage device 506, or memory on processor 502. For example, the information carrier may be a non-transitory, machine-readable storage medium.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer, e.g., a laptop computer 522. Alternatively, components from computing device 500 may be combined with other components in a mobile device (not shown), e.g., device 550. Each of such devices may contain one or more of computing device 500, 550, and an entire system may be made up of multiple computing devices 500, 550 communicating with each other.

Computing device 550 includes a processor 552, memory 564, an input/output device, e.g. a display 554, a communication interface 566, and a transceiver 568, among other components. The device 550 may also be provided with a storage device, e.g., a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, e.g., control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, e.g., using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, e.g., through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engine described herein can be separated, combined or incorporated into a single or combined engine. The engines depicted in the figures are not intended to limit the systems described herein to the software architectures shown therein.

In some implementations, the engines described herein can be separated, combined or incorporated into a single or combined engine. The engines depicted in the figures are not intended to limit the systems described here to the software architectures shown in the figures.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

In the context of this disclosure, the terms social network and social networking service may be used interchangeably.

Other implementations not specifically described herein are also within the scope of the following claims.

What is claimed is:

1. A method comprising:
    receiving, by one or more processors, from a user computing device associated with a user, user input indicating only a request for content and exclusive of a user entered search query, the user subscribing as a member to a social networking service;
    in response to receiving the user input indicating only the request for content and that is exclusive of a user entered search query, performing a search of web-based resources, comprising:
        i) identifying one or more other members that subscribe to the social networking service;
        ii) identifying one or more engagements with the web-based resources, wherein the one or more engagements are performed by the one or more other members, the identifying including, for a subset of the one or more engagements, identifying an event associated with the subset of the one or more engagements;
        iii) associating, for each web-based resource of the web-based resources, a quantifiable value with the web-based resource based on the one or more engagements performed by the one or more other members with the web-based resource, wherein, for a subset of the web-based resources that each include content that is associated with the event, the quantifiable value is associated with a pattern in which the subset of the web-based resources have been shared by the one or more other members of the social networking service, the pattern based on, for each web-based resource of the subset of the web-based resources that is shared, a number of shares of the web-based resource within a threshold period of time of the event and that is greater than a threshold quantity of shares;
        iv) generating, by the one or more processors, for each web-based resource of the web-based resources, a social engagement signal based on a) the quantifiable value associated with the web-based resource and b) independent of the user input indicating only the request for content;
    in response to receiving the user input indicating only the request, generating a query based on one or more of the social engagement signals, the query comprising one or more keywords that are absent from the request;
    identifying, based on the query, one or more of the web-based resources likely to be of interest to the user providing the request; and
    providing search results to the user computing device, the search results identifying at least one of the one or more identified web-based resources.

2. The method of claim 1, further comprising:
    in response to receiving the request, accessing user profile information associated with the user; and
    identifying, based on the query and the user profile information, the web-based resources likely to be of interest to the user.

3. The method of claim 1, wherein a quantifiable value associated with a particular web-based resource corresponds to a number of times the particular web-based resource has been shared by the one or more other members of the social networking service.

4. The method of claim 1, wherein a quantifiable value associated with a particular web-based resource corresponds to a number of comments by the one or more other members of the social networking service on the particular web-based resource.

5. The method of claim 1, wherein a quantifiable value associated with a particular web-based resource corresponds to a number of recommendations by the one or more other members of the social networking service on the particular web-based resource.

6. The method of claim 1, wherein a quantifiable value associated with a particular web-based resource corresponds to a combination including two or more of the following: a number of times a web-based resource has been shared by the one or more other members of the social networking service; a pattern in which the web-based resource has been shared by the one or more other members of the social networking service; a number of comments by the one or more other members of the social networking service on the web-based resource; and a number of recommendations by the one or more other members of the social networking service on the web-based resource.

7. The method of claim 1, wherein providing the search results to the user computing device comprises providing the search results in a ranked order corresponding to weights associated with respective social engagement signals.

8. The method of claim 1, wherein the request includes an indication for a search using the social engagement signals, and wherein the social engagement signals are unspecified in the request.

9. The method of claim 1, further comprising updating the social engagement signals based on interactions by the user computing device with the at least one of the web-based resources identified by the search results.

10. The method of claim 1, wherein the web-based resources include social networking service based resources.

11. The method of claim 1, wherein, for each web-based resource of the web-based resources, the social engagement signal is predefined.

12. A non-transitory computer storage medium encoded with computer program instructions that, when executed by one or more computers, cause the one or more computers to perform operations comprising:
    receiving, from a user computing device associated with a user, user input indicating only a request for content and exclusive of a user entered search query, the user subscribing as a member to a social networking service;
    in response to receiving the user input indicating only the request for content and that is exclusive of a user entered search query, performing a search of web-based resources, comprising:
        i) identifying one or more other members that subscribe to the social networking service;

ii) identifying one or more engagements with the web-based resources, wherein the one or more engagements are performed by the one or more other members, the identifying including, for a subset of the one or more engagements, identifying an event associated with the subset of the one or more engagements;

iii) associating, for each web-based resource of the web-based resources, a quantifiable value with the web-based resource based on the one or more engagements performed by the one or more other members with the web-based resource, wherein, for a subset of the web-based resources that each include content that is associated with the event, the quantifiable value is associated with a pattern in which the subset of the web-based resources have been shared by the one or more other members of the social networking service, the pattern based on, for each web-based resource of the subset of the web-based resources that is shared, a number of shares of the web-based resource within a threshold period of time of the event and that is greater than a threshold quantity of shares;

iv) generating for each web-based resource of the web-based resources, a social engagement signal based on a) the quantifiable value associated with the web-based resource and b) independent of the user input indicating only the request for content;

in response to receiving the user input indicating only the request, generating a query based on one or more of the social engagement signals, the query comprising one or more keywords that are absent from the request;

identifying, based on the query, one or more of the web-based resources likely to be of interest to the user providing the request; and providing search results to the user computing device, the search results identifying at least one of the one or more identified web-based resources.

13. The non-transitory computer storage medium of claim 12, wherein the operations further comprise:
in response to receiving the request, accessing user profile information associated with the user; and
identifying, based on the query and the user profile information, the web-based resources likely to be of interest to the user.

14. The non-transitory computer storage medium of claim 12, wherein a quantifiable value associated with a particular web-based resource corresponds to a number of times the particular web-based resource has been shared by the one or more other members of the social networking service.

15. The non-transitory computer storage medium of claim 12, wherein a quantifiable value associated with a particular web-based resource corresponds to a number of comments by the one or more other members of the social networking service on the particular web-based resource.

16. The non-transitory computer storage medium of claim 12, wherein a quantifiable value associated with a particular web-based resource corresponds to a number of recommendations by the one or more other members of the social networking service on the particular web-based resource.

17. The non-transitory computer storage medium of claim 12, wherein a quantifiable value associated with a particular web-based resource corresponds to a combination including two or more of the following: a number of times a web-based resource has been shared by the one or more other members of the social networking service; a pattern in which the web-based resource has been shared by the one or more other members of the social networking service; a number of comments by the one or more other members of the social networking service on the web-based resource; and a number of recommendations by the one or more other members of the social networking service on the web-based resource.

18. The non-transitory computer storage medium of claim 12, wherein providing the search results to the user computing device comprises providing the search results in a ranked order corresponding to weights associated with respective social engagement signals.

19. A system comprising:
one or more computers and one or more storage devices storing instructions that, when executed by the one or more computers, cause the one or more computers to perform operations comprising:
receiving, from a user computing device associated with a user, user input indicating only a request for content and exclusive of a user entered search query, the user subscribing as a member to a social networking service;
in response to receiving the user input indicating only the request for content and that is exclusive of a user entered search query, performing a search of web-based resources, comprising:

i) identifying one or more other members that subscribe to the social networking service;

ii) identifying one or more engagements with the web-based resources, wherein the one or more engagements are performed by the one or more other members, the identifying including, for a subset of the one or more engagements, identifying an event associated with the subset of the one or more engagements;

iii) associating, for each web-based resource of the web-based resources, a quantifiable value with the web-based resource based on the one or more engagements performed by the one or more other members with the web-based resource, wherein, for a subset of the web-based resources that each include content that is associated with the event, the quantifiable value is associated with a pattern in which the subset of the web-based resources have been shared by the one or more other members of the social networking service, the pattern based on, for each web-based resource of the subset of the web-based resources that is shared, a number of shares of the web-based resource within a threshold period of time of the event and that is greater than a threshold quantity of shares;

iv) generating for each web-based resource of the web-based resources, a social engagement signal based on a) the quantifiable value associated with the web-based resource and b) independent of the user input indicating only the request for content;

in response to receiving the user input indicating only the request, generating a query based on one or more of the social engagement signals, the query comprising one or more keywords that are absent from the request;

identifying, based on the query, one or more of the web-based resource likely to be of interest to the user providing the request; and providing search results to the user computing device, the search results identifying at least one of the one or more identified web-based resources.

20. The system of claim 19, wherein the operations further comprise:

in response to receiving the request, accessing user profile information associated with the user; and identifying, based on the query and the user profile information, the web-based resources likely to be of interest to the user.

21. The system of claim 19, wherein a quantifiable value associated with a particular web-based resource corresponds to a number of times the particular web-based resource has been shared by the one or more other members of the social networking service.

22. The system of claim 19, wherein a quantifiable value associated with a particular web-based resource corresponds to a number of comments by the one or more other members of the social networking service on the particular web-based resource.

23. The system of claim 19, wherein a quantifiable value associated with a particular web-based resource corresponds to a number of recommendations by the one or more other members of the social networking service on the particular web-based resource.

24. The system of claim 19, wherein a quantifiable value associated with a particular web-based resource corresponds to a combination including two or more of the following: a number of times a web-based resource has been shared by the one or more other members of the social networking service; a pattern in which the web-based resource has been shared by the one or more other members of the social networking service; a number of comments by the one or more other members of the social networking service on the web-based resource; and a number of recommendations by the one or more other members of the social networking service on the web-based resource.

25. The system of claim 19, wherein providing the search results to the user computing device comprises providing the search results in a ranked order corresponding to weights associated with respective, social engagement signals.

\* \* \* \* \*